US006227625B1

(12) United States Patent
Gaughan

(10) Patent No.: US 6,227,625 B1
(45) Date of Patent: May 8, 2001

(54) TWO WAY FIELD TESTER FOR EOT DEVICE

(75) Inventor: Edward W. Gaughan, Greensburg, PA (US)

(73) Assignee: Westinghouse Air Brake Company, Wilmerding, PA (US)

( * ) Notice: Subject to any disclaimer, the term of this patent is extended or adjusted under 35 U.S.C. 154(b) by 0 days.

(21) Appl. No.: 09/382,290

(22) Filed: Aug. 24, 1999

(51) Int. Cl.⁷ .............................. B60T 15/14; G01M 3/02; G01L 5/28
(52) U.S. Cl. .................................... 303/15; 73/39; 73/121
(58) Field of Search ............................... 303/1, 3, 15, 86; 73/39, 121; 246/186

(56) References Cited

U.S. PATENT DOCUMENTS 5,016,840 * 5/1991 Bezos ................................ 246/187 R
5,507,457 * 4/1996 Kull ................................... 246/169 R
5,866,811 * 2/1999 Skantar ................................... 73/121

* cited by examiner

Primary Examiner—Christopher P. Schwartz
Assistant Examiner—C. T. Bartz

(74) Attorney, Agent, or Firm—James Ray & Associates

(57) ABSTRACT

A portable device permits testing of an EOT unit of a two-way end-of-train (EOT) radio telemetry system. During the test, the EOT unit may be mounted to and fully installed on the railcar on which it is to be used. The portable device includes a microprocessor unit, a display, and a transceiver that enables the invention to communicate with the EOT unit. The portable device also includes a mechanism for authorizing the portable device to communicate with the EOT unit. Used to control the overall operation of the portable device, the microprocessor unit operates the transceiver in cooperation with the aforementioned mechanism so as to authorize the portable device to communicate with the EOT unit according to an arming procedure. The microprocessor unit also operates the display on which the progress and completion of the arming procedure is indicated. When the portable device is authorized to operate with the EOT unit, the display is directed to indicate operational data that it receives from the EOT unit pertaining to the railcar to which the EOT unit is connected. The portable device further includes a mechanism for initiating an emergency reduction in pressure within the brake pipe of the railcar. When the emergency initiating mechanism is activated, the microprocessor unit commands the transceiver to transmit an emergency brake signal. It is by this emergency brake signal that the EOT unit is ordered to reduce the pressure within the brake pipe of the railcar at an emergency rate.

20 Claims, 3 Drawing Sheets

TWO WAY FIELD TESTER FOR EOT DEVICE

FIELD OF THE INVENTION

The invention generally relates to end-of-train (EOT) radio telemetry systems used in the railroad industry. More particularly, the invention pertains to a hand held device that can be used to test whether an EOT unit of a two-way EOT radio telemetry system is operating properly.

BACKGROUND OF THE INVENTION

The following background information is provided to assist the reader to understand the environment in which the invention will typically be used. The terms used herein are not intended to be limited to any particular narrow interpretation unless specifically stated otherwise in this document.

As shown in FIG. 1, a typical freight train 1 includes one or more locomotives 2, a plurality of railcars 3 and a pneumatic trainline known as the brake pipe 4. For a freight train headed by a locomotive equipped with a conventional pneumatic brake control system, the brake pipe 4 is the only means by which service and emergency brake commands are conveyed from the lead locomotive to each railcar in the train.

The brake pipe 4 is essentially one long continuous tube that runs from the lead locomotive to the last railcar in the train. As shown in FIG. 2, it is actually composed of a series of pipe lengths 4a, with one pipe length secured to the underside of each railcar. At the end of each pipe length is a glad hand 7. The brake pipe 4 is formed by coupling the glad hand 7 on the end of each pipe length 4a to the glad hand of another such pipe length on an adjacent rail vehicle. It is to this brake pipe 4 that the pneumatic brake equipment on each railcar connects via a branch pipe 8. As is well known in the railroad industry, by moving the automatic brake handle 21 located in the locomotive, the train operator can control how much, if any, pressure is contained within the brake pipe 4 and thus whether, and to what extent, the train brakes will be applied. The positions into which the brake handle can be moved include release, minimum service, full service, suppression, continuous service and emergency. Between the minimum and full service positions lies the service zone wherein each incremental movement of the handle 21 toward the full service position causes the brake pipe pressure to reduce incrementally.

The pneumatic brake equipment on each railcar includes two storage reservoirs 9 and 19, one or more brake cylinders 11 and at least one pneumatic brake control valve 12 such as an ADB, ABDX or ABDW type valve made by the Westinghouse Air Brake Company (WABCO). The pneumatic brake control valve 12 has a service portion 13 and an emergency portion 14 mounted to a pipe bracket 15. The pipe bracket 15 features a number of internal passages and several ports. Each port connects to one of the interconnecting pipes from the railcar such as those leading to the brake pipe 4, the brake cylinder 11 and the two reservoirs 9 and 19. It is through the ports and internal passages of the pipe bracket 15 that the service and emergency portions of the brake control valve 15 communicate fluidly with the pneumatic piping on the railcar.

It is well known that the pressure level within the brake pipe 4 determines whether the brake control valve 12 will charge the reservoirs 9 and 19 or deliver pressurized air previously stored in one or both of these reservoirs to the brake cylinders 11. By changing the pressure within the brake pipe 4, the brake pipe can be used to convey release, service and emergency brake commands to the pneumatic brake equipment on each railcar in the train. In response to a release brake command (i.e., when brake pipe pressure is restored to its maximum level as set by the train operator), the service portion 13 of brake control valve 12 not only charges the two reservoirs 9 and 19 with the pressurized air it receives from the brake pipe 4 but also vents the brake cylinders 11 to atmosphere thereby causing the brakes on the train to release. In response to a service brake command (i.e., when brake pipe pressure is reduced at a service rate), the service portion 13 supplies air from only one of the two reservoirs to the brake cylinders 11 so as to apply the train brakes. How much the brake pipe pressure is reduced, and thus the magnitude of the service brake application, depends on how far the handle 21 is moved towards the full service position. In response to an emergency brake command (i.e., when the brake pipe pressure is reduced to zero at an emergency rate), the emergency portion 14 of brake control valve 12 supplies air from both reservoirs 9 and 19 to the brake cylinders 11 so as to apply the train brakes fully. The emergency portion 14 also accelerates the pressurizing of the brake cylinders 11 by venting the brake pipe 4 on the railcar.

On each railcar and locomotive, each brake cylinder 11 converts to mechanical force the pressurized air it receives from its corresponding brake control valve 12. From the brake cylinders this force is transmitted by mechanical linkage (not shown) to the brake shoes (not shown) causing the brake shoes to be forced against, and thus to stop or slow the rotation of, the wheels of the rail vehicle. The magnitude of the braking force applied to the wheels is directly proportional to the pressure built up in the brake cylinders 11. For a freight train equipped with the conventional pneumatic brake system, it is thus the pressure level within the brake pipe 4 that determines whether and to what extent the brakes will be applied.

For a train headed by a locomotive equipped with an ECP (electrically controlled pneumatics) based brake control system, release, service and emergency brake commands are conveyed electrically to the ECP brake - equipment on each railcar of the train via a two wire ECP trainline (not shown). The ECP brake equipment (not shown) on each railcar is essentially the same as the railcar brake equipment previously described, except for the service portion 13 of the brake control valve. As is well known in the art, a car control unit (CCU), one or more pressure transducers and various pneumatic and electropneumatic valves are used in lieu of the service portion. The pressure transducers are used to monitor pressure in the brake pipe and the brake cylinders as well as the pressure in the two reservoirs. Supplied from a 74V dc power line of the MU cable in the locomotive, the ECP trainline operates at a nominal 230V dc to provide power to the ECP brake equipment on each railcar.

In a manner well known in the railroad industry, by moving the brake handle of the master controller in the locomotive, the train operator can transmit along the ECP trainline the desired brake command to the ECP brake equipment on each railcar in the train. Controlled ultimately from the locomotive, each CCU is connected via branch wiring to the ECP trainline from which it receives the electrical brake commands issued by the master controller. The degree of brake application ordered by the master controller is typically conveyed in terms of a percentage of the brake cylinder pressure required for a full service application of the brakes. For example, zero percent (0%) is typically designated for a release of the brakes, 15% for a minimum service brake application, 100% for a full service brake application and 120% for an emergency application of the brakes. According to the dictates of the particular electrical brake command transmitted from the locomotive, each CCU controls its electropneumatic valves through which pressurized air can be supplied to or exhausted from the brake cylinders under its control.

For railcars equipped with ECP brake equipment, the brake pipe still serves as the source of pressurized air from which to charge the reservoirs on each railcar when the brakes are released. During service and emergency braking, it is still from one and both reservoirs, respectively, that pressurized air is delivered to the brake cylinders to apply the railcar brakes. In the ECP brake control system, however, the brake pipe is not used to convey service brake commands. It is used only to convey emergency brake commands as a pneumatic backup to the electrical emergency brake commands conveyed by the master controller along the ECP trainline. Should a loss of power or other critical electrical failure occur, the ECP brake equipment is designed to respond pneumatically to an emergency pressure reduction in the brake pipe 4 by supplying pressurized air from both reservoirs to the brake cylinders 11 thereby causing an emergency application of the brakes under its control.

Many trains, whether equipped with conventional or ECP brake control systems, are also rigged with any one of several known end-of-train (EOT) radio telemetry systems. These systems include a locomotive control unit (LCU) in the locomotive and an EOT unit on a railcar, typically the last railcar, in the train. Also referred to as a head of train (HOT) unit, the LCU is mounted to the train operator's console in the locomotive. Mounted to the last railcar, the EOT unit is coupled to the brake pipe 4 by means of a hose and a glad hand.

In a one-way EOT system, the EOT unit transmits to the HOT unit via radio signals data pertaining to the pressure in the brake pipe and the motion of the last railcar. To accomplish this, the EOT unit includes a pressure transducer to monitor brake pipe pressure, a motion sensor to sense movement of the railcar, a microprocessor unit to control the overall operation of these components, and a transmitter that the microprocessor unit uses to transmit this last railcar data. In the locomotive, the HOT unit includes a receiver to receive transmissions from the EOT unit, a primary display and a microprocessor unit to direct the operation of these components. Using the last railcar data it receives from is the EOT unit, the HOT unit thus continuously updates the train operator with the status of operations at the rear of the train. More notably, if a potentially dangerous situation arises such as the brake pipe pressure plunges suddenly or drops below a predetermined level, the HOT unit operates to warn the train operator that an emergency condition exists at the rear of the train.

For a train equipped with a one-way EOT system, the emergency brake application starts at the locomotive and progresses along the brake pipe to the last railcar. For long trains, reducing the pressure in the brake pipe from the head of the train can be quite time consuming, particularly for a train equipped with a conventional pneumatic brake control system. Moreover, if one of the angle cocks 5 is left closed or the brake pipe 4 is otherwise restricted, the brake equipment beyond the restriction may not receive the emergency brake command needed to apply the brakes in an emergency. For this reason, two-way EOT systems have been developed under the auspices of the American Association of Railroads (AAR).

In a two-way EOT system such as the TRAINLINK® II EOT system manufactured by WABCO, the HOT and EOT units still perform all of the functions attributed to their counterparts in the one-way EOT system. As shown in FIG. 1, the EOT unit 55 is thus still used to transmit the aforementioned radio signals by which last railcar brake pipe pressure and motion data is conveyed to the HOT unit 51. The two-way EOT and HOT units, however, are each equipped with a transceiver (i.e., combination transmitter and receiver) as compared to the single transmitter and receiver for the one-way EOT and HOT units, respectively. The EOT unit 55 also has an emergency brake valve that is controlled by its microprocessor unit, and the HOT unit 51 also includes an emergency toggle switch. By toggling this switch in an emergency, the train operator can cause the HOT unit 51 to transmit an emergency brake radio signal to the EOT unit 55. By its microprocessor unit, the EOT unit responds to this emergency signal by commanding its emergency brake valve to reduce the pressure in the brake pipe at an emergency rate. Combined with the emergency reduction in brake pipe pressure initiated from the head end of the train using the aforementioned locomotive brake equipment, the two-way EOT system allows an even faster application of the railcar brakes in an emergency.

In this two-way EOT system, the HOT unit has a primary display panel which features a dedicated display for each of several types of last railcar data. The last railcar data displayed includes brake pipe pressure, low battery condition, whether the railcar is stopped or in motion, and whether an emergency has been enabled or disabled. The HOT unit 51 also has a supplemental message display by which it visually conveys additional information such as, for example, data related to arming of the EOT system and whether or not the EOT and HOT units are communicating properly.

For a train equipped with a conventional pneumatic brake control system wherein the brake pipe 4 is used to pneumatically convey both service and emergency brake commands to the railcars, another EOT radio telemetry system, such as the TRAINLINK® ES system manufactured by WABCO, may be used. It is, of course, well known that an emergency application is initiated at a rate much faster than a service application. Typically, the emergency reduction in pressure propagates along the brake pipe at a speed of approximately 900 feet/sec. Consequently, for a one mile long train, the propagation time would be in the range of 10 to 15 seconds. In contrast, a service application can take well over a minute to reach the last railcar; hence the need for, and development of, the TRAINLINK® ES system.

In addition to the two-way HOT and EOT units, the TRAINLINK® ES system has a Service Interface Unit (SIU) 52 that connects between the serial port of the ES HOT unit 51 and the brake pipe on the locomotive. The SIU 52 provides the ES HOT unit 51 with the current brake pipe pressure. This allows the ES HOT unit 51 to automatically initiate a service brake application at the last railcar simultaneously with the service reduction in brake pipe pressure initiated from the locomotive. Specifically, the ES HOT unit 51 in the locomotive 2 automatically transmits a service brake radio signal to the ES EOT unit 55 when it detects a service reduction in brake pipe pressure via the SIU 52. By its microprocessor unit, the two-way ES EOT unit 55 responds to this service brake signal by commanding its emergency valve to reduce the brake pipe pressure from the last railcar at the same service rate as that ordered by the locomotive brake equipment at the head of the train. A service application of the brakes can thus be made much faster on a train equipped with a TRAINLINK® ES or similar type EOT system. Using the SIU, the ES HOT unit can also automatically transmit an emergency brake signal when an emergency reduction in brake pipe pressure has been initiated by the locomotive brake equipment. The emergency toggle switch on the ES HOT unit can also be used to transmit this emergency brake signal.

As is well known in the railroad industry, two-way EOT systems employ an authorization protocol. After railcars are coupled to the locomotive(s) to form a train and before that train is put into service, the train operator must arm or authorize the HOT unit 51 in the lead locomotive 2 to communicate only with the EOT unit 55 on that particular train. The authorization protocol prevents an HOT unit 51 on one train from being erroneously or maliciously used to apply the brakes on another train. To this end, the HOT unit 51 includes a thumb wheel switch assembly and a nonvolatile memory in which an identification code unique to a particular EOT unit can be stored. With that EOT unit on the last railcar, only when the train operator sets the thumb wheel switches to correspond to the EOT identification code stored in its memory is the HOT unit authorized to communicate with the EOT unit on the train. The HOT unit retains in its memory the identification code for that particular EOT unit until armed for a different EOT unit.

To authorize the HOT unit to communicate with a different EOT unit, a railroad employee pushes a test button on the new EOT unit so that it will transmit a first authorization signal. This signal contains the identification code of the EOT unit along with a special message identifier and confirmation bit. When the HOT unit 51 receives the transmission, it displays an ARM NOW message if the stored code differs from the identification code of the new EOT unit. By manually pushing the COMM TEST/ARM button on the HOT unit 51 within six seconds of the ARM NOW message being displayed, the train operator initiates a status update request (SUR). If the EOT unit receives the SUR within six seconds from the time the EOT test button was pushed, the EOT unit responds by transmitting a second authorization signal. This signal contains a special message identifier and confirmation bit. Upon receiving the EOT unit's response, and if its thumb wheel switches have been set to the identification code of the new EOT unit, the HOT unit 51 then displays the ARMED message and stores in its nonvolatile memory the identification code of the new EOT unit thereby overwriting the previously stored code. This procedure for arming the EOT system is more fully set forth in the 1989 Communications Manual, Parts 12–15, pp. 38–39, published by the AAR. Moreover, another procedure for arming the EOT system, among others known in the art, is taught in U.S. Pat. No. 5,016,840, incorporated into this document by reference.

Before the invention presented in this document, the only way to test whether an EOT unit 55 was working properly was to use an HOT unit 51. The problem is that an HOT unit 51 is a stationary, non-portable device, one that is enmeshed with the other equipment in the locomotive. Consequently, in order to test whether an EOT unit 55 is operating properly, one must essentially assemble a train first. Specifically, one must first install the subject EOT unit 55 on a railcar inclusive of the connections to the brake pipe 4, and then couple that railcar, inclusive of the brake pipe connections, to a locomotive. The locomotive, of course, must be equipped with the HOT unit appropriate for the subject EOT unit under test (e.g., only a TRAINLINK® ES type HOT unit can be used to completely test an EOT unit designed to respond to both service and emergency brake radio signals). Next, not only must the locomotive be powered up, but the brake pipe 4 of the train 1 must also be leak-tested and then charged to its maximum set-up pressure. The resulting two-way EOT system can then be armed using the appropriate arming procedure. Only after the two-way EOT system is armed is the EOT unit ready to be tested to determine whether it properly responds to the brake signal(s) transmitted by its corresponding HOT unit.

The actual testing of the EOT unit, inclusive of the arming procedure, is a very laborious task. The arming procedure set forth by the AAR requires two individuals, one at the HOT unit in the locomotive and the other at the EOT unit on the railcar, working in concert to arm the EOT system. Testing the functions of the EOT unit also requires two people. For example, the operator in the locomotive must cause the HOT unit to transmit the applicable brake radio signal to the EOT unit. The railyard worker at the EOT unit must then verify whether the EOT unit has actually responded to the signal by venting the brake pipe. Though the arming procedure described in U.S. Pat. No. 5,016,840 requires just the operator at the HOT unit, the testing of the EOT unit still involves substantial labor. For example, once the EOT system is armed, either the train operator in the locomotive or a second person altogether must go to the end of the train to verify that the EOT unit has responded to the brake radio signal by venting the brake pipe according to the dictates of the particular brake signal received.

The main disadvantages of these prior art ways of testing an EOT unit are that they require substantial investments of time and labor. Prior to the invention presented below, no device had been proposed that would allow the EOT unit to be tested outside the environment in which it operated. Specifically, the lack of such a testing device had meant that a train (i.e., at least one locomotive and one railcar) first had to be assembled, with the EOT unit to be tested installed on the railcar. Next, the resulting EOT system had to be armed and then the EOT unit tested as noted above. The lack of such a testing device meant that there was no simple and less laborious and time consuming way of testing an EOT unit.

Another shortcoming related to the current practice of testing a two-way EOT system often arises in the assembly of long freight trains. It is, of course, advisable to test the EOT system before the train is to begin its run. Unfortunately, the radio link between the HOT and EOT units may not be able to be established until after the train has departed due to the terrain of the railyard or other area in which the train is assembled. The topography of the assembly area may have natural or man-made obstructions that block or interfere with the transmission and reception of the radio signals. The invention described and claimed below—a portable test device—is intended to address these disadvantages and shortcomings.

OBJECTIVES OF THE INVENTION

It is, therefore, a primary objective of the invention to provide a portable device designed to simplify testing of an end-of-train (EOT) unit of a two-way EOT radio telemetry system.

Another objective of the invention is to provide a portable device for testing an EOT unit outside the environment in which it is normally used on the last railcar of a train.

Yet another objective is to provide a hand held test device that can be used by one person to test whether an EOT unit is in proper working condition.

Still another objective is to provide a portable EOT unit test device that is capable of emulating the functions of an HOT unit of a two-way EOT radio telemetry system.

A further objective of the invention is to provide a portable device that is capable of being used to test an EOT unit of the type manufactured by WABCO as part of the TRAINLINK® II or the TRAINLINK® ES EOT radio telemetry systems.

In addition to the objectives and advantages listed above, various other objectives and advantages of the invention will become more readily apparent to persons skilled in the relevant art from a reading of the detailed description section of this document. The other objectives and advantages will become particularly apparent when the detailed description is considered along with the accompanying drawings and claims.

SUMMARY OF THE INVENTION

In a presently preferred embodiment, the invention provides a portable device for testing a prior art end-of-train (EOT) unit. The EOT unit is of the type found in many of the two-way EOT radio telemetry systems in use today in the railroad industry. Designed to be mounted to a railcar and pneumatically coupled to the brake pipe thereof, the EOT unit is of the type that transmits authorization signals and responds to a status update request as part of an arming procedure. As is well known in the industry, a two-way EOT system is authorized to operate only if its arming procedure is successfully completed. Once authorized to operate, the EOT unit is designed to transmit data signals. The data signals convey operational data such as the pressure currently contained by the brake pipe and whether or not the railcar is moving. The prior art EOT unit is also designed to respond to brake signals by reducing pressure in the brake pipe in a manner well known in the art. The portable device of the invention thus includes a microprocessor unit, a display, and a transceiver that enables the invention to communicate with the EOT unit. The portable device also includes a means for authorizing the portable device to communicate with the EOT unit. Used to control the overall operation of the portable device, the microprocessor unit operates the transceiver in cooperation with the authorizing means in authorizing the portable device to communicate with the EOT unit according to the arming procedure. The microprocessor unit also operates the display on which the progress and completion of the arming procedure is indicated. When the portable device has been successfully authorized to operate with the EOT unit, the microprocessor unit uses the display to indicate the operational data that the transceiver continuously receives from the EOT unit. The portable device further includes a means for initiating an emergency reduction in pressure in the brake pipe. When this emergency initiating means is activated, the microprocessor unit will command the transceiver to transmit an emergency brake signal. It is with this emergency brake signal that the prior art EOT unit is ordered to reduce the brake pipe pressure at an emergency rate.

In a more enhanced embodiment intended for trains equipped with conventional brake control systems wherein the brake pipe is used to convey both service and emergency brake commands, the portable device also includes a means for initiating a service reduction in pressure in the brake pipe of the railcar. When this service initiating means is activated, the microprocessor unit will command the transceiver to transmit a service brake signal. It is with this service brake signal that the prior art EOT unit is ordered to reduce the brake pipe pressure of the railcar at a service rate.

DETAILED DESCRIPTION OF THE INVENTION

Figure 1:
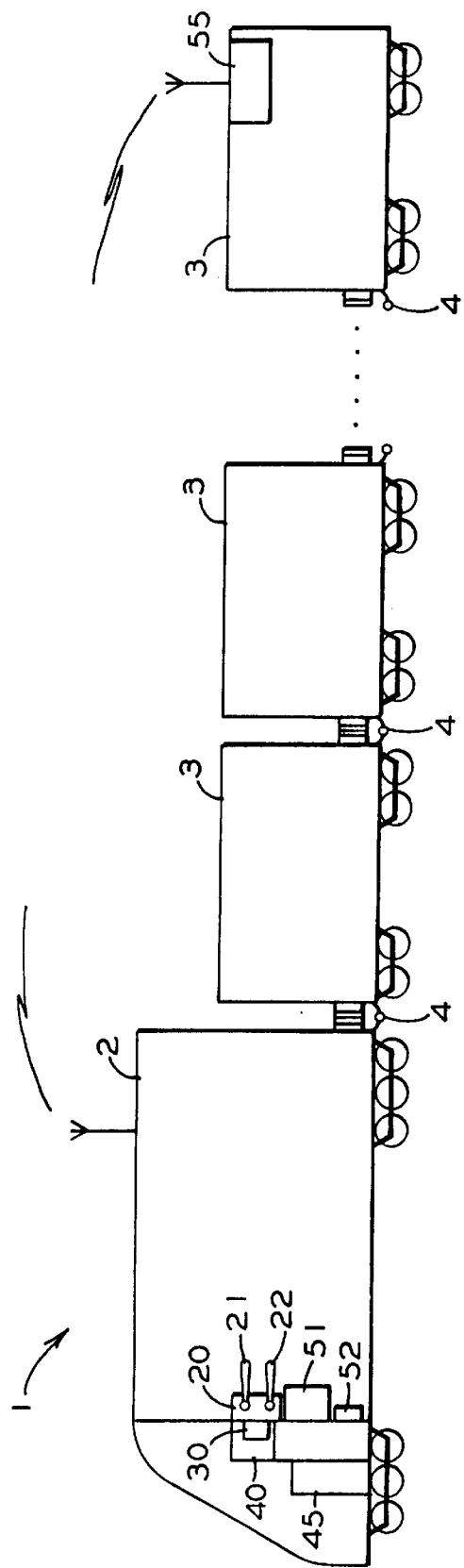
FIG. 1 illustrates a freight train 1 equipped with a conventional pneumatic brake control system and an end-of-train (EOT) radio telemetry system inclusive of an HOT unit 51, a service interface unit (SIU) 52 and an EOT unit 55.
Figure 2:
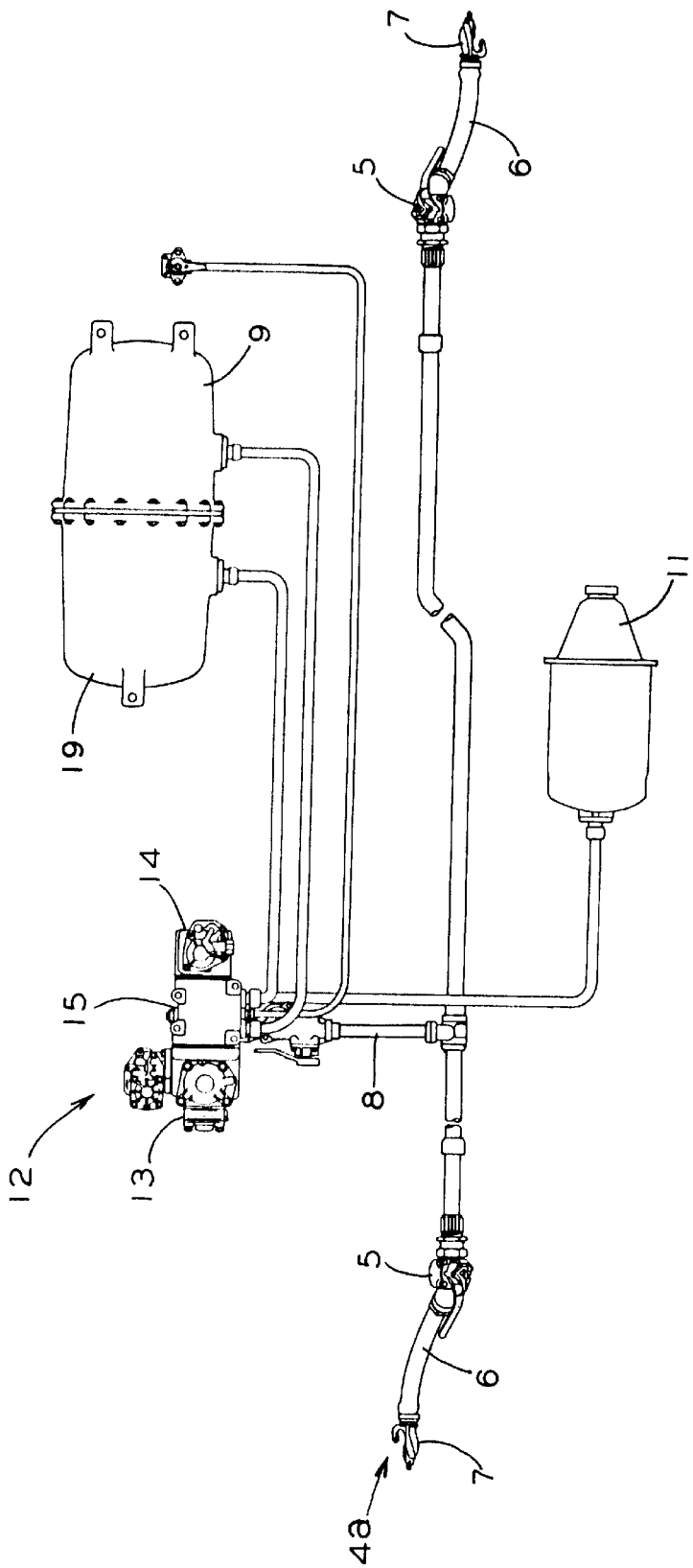
FIG. 2 illustrates the pneumatic brake equipment of a railcar 3 and the brake pipe 4 of the freight train 1 to which it connects.

Before describing the invention in detail, the reader is advised that, for the sake of clarity and understanding, identical components having identical functions have been marked where possible with the same reference numerals in each of the Figures provided in this document.

Figure 3:
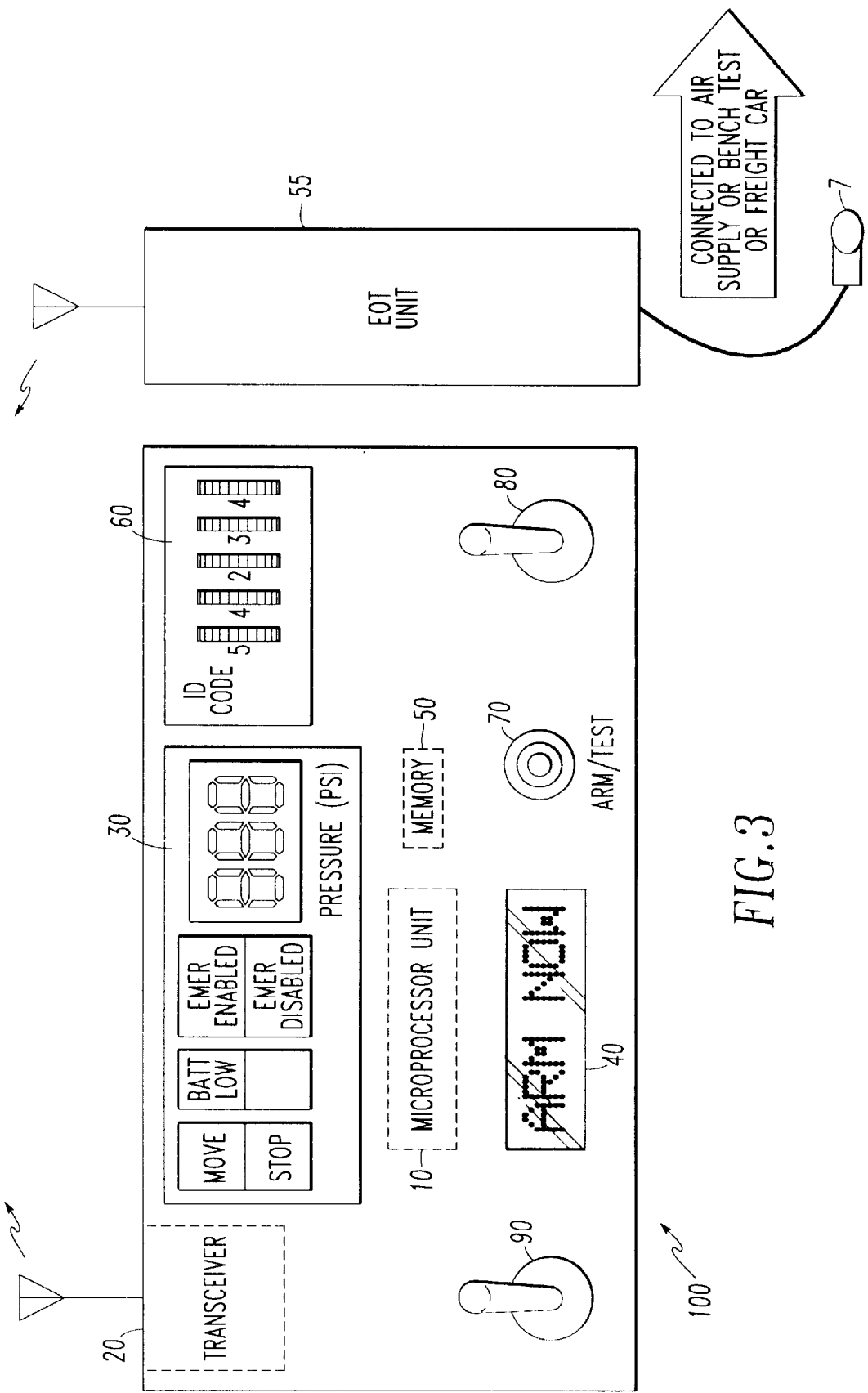
FIG. 3 illustrates a portable device, according to the invention, that is designed to simplify testing of an end-of-train (EOT) unit 55 of a two-way EOT radio telemetry system.

FIG. 3 illustrates the essential details of a portable device, generally designated 100, that is designed to simplify testing of an end-of-train (EOT) unit 55 of a two-way EOT radio telemetry system. In a presently preferred embodiment, the portable device includes a microprocessor unit 10, a transceiver 20, a primary display 30, a supplemental display 40, a memory storage device 50, a thumbwheel switch assembly 60, an arm/test button mechanism 70 and an emergency toggle switch 80.

Regarding the particulars of the aforementioned components, the microprocessor unit 10 may take the form of any one of the many microprocessor chips commercially available today in the marketplace. Obviously, it may also be accompanied by a requisite number of volatile memory devices, such as RAM (random-access memory), to perform ancillary tasks, such as those typically associated with prior art HOT devices. These memory devices may, of course, be either separate from or actually embodied in the microprocessor unit 10.

The primary display 30 preferably has several dedicated display panels, one for each of the operating parameters monitored by the EOT unit 55. This is so that the operating parameters can be viewed simultaneously during testing of the EOT unit. The supplemental display 40, however, preferably takes the form of an alphanumeric grid by which to convey various messages serially to the user. This type of display 40 is ideally suited to indicate other information such as data related to the arming procedure and whether or not the test device 100 and the EOT unit are communicating properly. The memory storage device 50 can be selected from any one of the known types of re-programmable nonvolatile semiconductor memories such as PROM (programmable read-only memory), EPROM (erasable PROM) and EEPROM (electrically erasable PROM).

The microprocessor unit 10 controls the overall operation of the portable device 100 including its function during the arming procedure. It is by the arming procedure, described below, that the test device 100 and EOT unit 55 will be authorized to operate together. Unlike prior art practice, this arming procedure (as well as the actual testing of the subject EOT unit) does not require the EOT unit to be first installed on a railcar of a train. Due to the portability of the test device 100, the EOT unit can be armed and tested outside the environment in which it is typically used. For example, as suggested by FIG. 3, the subject EOT unit 55 may be disposed on a test bench with its glad hand 7 coupled to a test volume that is supplied by a source of pressurized air. The EOT unit may instead be armed and tested while mounted to a railcar with its glad hand coupled to the brake pipe length 4a thereof, even if that railcar is not coupled to other railcars. The glad hand at the other end of the brake pipe length 4a need only be coupled to the source of pressurized air. Alternatively, the portable test device 100 may be used to test the EOT unit while it is attached to the last railcar of a fully assembled train just prior to departure from a railyard.

Being portable, the test device 100 can be brought in close proximity to the EOT unit to be tested, unlike prior art practice with the stationary HOT units. Consequently, as compared to prior art practice which requires two workers, the portable device 100 enables one worker/user to perform the arming procedure and the subsequent testing of the EOT unit 55.

The arming procedure imposes an authorization protocol that both the invention 100 and the subject EOT unit must satisfy before the test device will be authorized to operate with the EOT unit. During this arming procedure, the microprocessor unit 10 operates the transceiver 20 in cooperation with the memory storage device 50, thumbwheel switch assembly 60 and arm/test button mechanism 70. Specifically, preferably at the start of the authorization protocol, the worker/user should set the switches of thumbwheel assembly 60 to correspond to the identification code of the EOT unit 55 to be tested. When ready to begin the arming procedure, the worker can then push the test button on the EOT unit 55 so that it will transmit the first authorization signal. As is known in the art, the first authorization signal contains the identification code of the EOT unit 55 along with a special message identifier and confirmation bit. When transceiver 20 receives this signal, the microprocessor unit displays an ARM NOW message on supplemental display 40 but only if the identification code contained within the first authorization signal differs from whatever code may be stored in memory storage device 50. Furthermore, if the user pushes the arm/test button of mechanism 70 within six seconds of the ARM NOW message being displayed, the microprocessor unit 10 commands transceiver 20 to transmit a status update request (SUR). If the EOT unit 55 receives the SUR within six seconds from the time its own test button was pushed, the EOT unit responds by transmitting the second authorization signal. When transceiver 20 receives the second authorization signal, the microprocessor unit 10 (i) displays an ARMED message on supplemental display 40 and (ii) overwrites the code previously stored in memory storage device 50 with the identification code of the now newly authorized EOT unit 55.

The microprocessor unit 10 should be programmed to display an error message on supplemental display 40 should the arming procedure not be performed properly. For example, if the user failed to preset the switches of thumbwheel assembly 60 correctly, the microprocessor unit 10 would not display the ARMED message, nor would the previously stored code be overwritten in the memory storage device 50. Should this occur, a message such as ARMING ERROR or other appropriate indication could be displayed on the supplemental display 40.

Moreover, the portable device 100 allows the user to determine whether the EOT unit is operating properly during the arming procedure, and thus whether it is even capable of being armed. One example of an EOT unit failure would involve the user/worker performing the required tasks during the arming procedure, but the EOT unit 55 nevertheless failing to act correctly (e.g., failing to transmit properly an authorization signal). Merely by the failure of the EOT unit 55 to let itself be armed during the arming procedure will the portable device 100 inform the user that the EOT unit 55 is defective. This failure may be communicated to the user by displaying a COMM FAIL message on supplemental display 40. More important, however, is that the authorization protocol prevents the invention 100 from communicating with, and activating, any other EOT unit located within broadcast range of the test device 100.

Once authorized to operate with the EOT unit 55 to be tested, the portable device 100 can then be used to test whether the EOT unit 55 is capable of performing its intended functions. The test can be thought of as having two parts. The first part involves testing the monitoring capabilities of the EOT unit while the second part tests whether the EOT unit properly responds to the radio signals issued by the portable device 100.

Regarding the first part of the test in which the monitoring capabilities of the EOT unit 55 are tested, once the EOT unit is authorized to operate with the portable device 100, the EOT unit should begin to transmit data signals. As noted in the background section of this document, an EOT unit has a pressure transducer, a motion sensor and its own transmitter by which to send the data signals. Intended to monitor pressure within the brake pipe of a railcar, the pressure transducer can monitor the pressure within whatever test volume to which the ECT unit's glad hand is coupled. On a test bench, this test volume could be supplied by the aforementioned source of pressurized air. The motion sensor, of course, can be triggered merely by moving the EOT unit. Besides monitoring these operating parameters, the EOT unit should also be able to transmit the data signals indicative of the pressure and motion data. Should the portable device 100 not receive these data signals from EOT unit 55, the microprocessor unit 10 could be programmed to command supplemental display 40 to display a message such as DATA ERROR or other appropriate indication.

Should the EOT unit 55 be able to transmit the data signals, the portable device 100 will receive the data signals via its transceiver 20 and display the operational data carried thereby on the appropriate panels of primary display 30. Specifically, the microprocessor unit 10 should be programmed to display on each dedicated display panel of primary display 30 one of the operating parameters of the EOT unit 55. The user of the portable device 100 can then view the operating parameters simultaneously as the EOT unit is being tested. In particular, the operational data pertaining to the state of the motion sensor could be indicated by two separate panels, namely, the STOP and MOVE panels. If EOT unit 55 is held stationary, the microprocessor unit 10 would back-light the STOP panel. Conversely, if EOT unit 55 is in motion, the microprocessor unit 10 should back-light the MOVE panel. The panel dedicated to the display of brake pipe pressure, however, is preferably three seven-segment LED displays on which to numerically indicate the pressure read by the pressure transducer of the EOT unit. Optionally, another panel—the BATT LOW panel—could be illuminated whenever the battery of the portable device 100 discharges below a predetermined state of charge.

Referring still to the monitoring capabilities of the EOT unit 55, it is well known that an EOT unit is designed to regularly transmit the operational data so that the status of operations at the rear of the train can be continuously monitored from the front of the train via the HOT unit. Potentially dangerous situations—such as the brake pipe pressure plunging suddenly or dropping below a predetermined level—have customarily been brought to the attention of the train operator though the HOT unit. When testing with the portable testing device 100, however, such emergency conditions can be mimicked on a test bench merely by dropping the pressure within, or removing the glad hand 7 of EOT unit 55 from, the test volume. Consequently, when transceiver 20 receives data from the EOT unit indicating such a condition has occurred, the microprocessor unit 10 can be used to command primary display 30 to indicate that such an emergency has been detected. For example, the microprocessor unit 10 could be programmed to illuminate one panel of primary display 30—the EMER ENABLED panel—when such an emergency condition has arisen (i.e., enabled by EOT unit 55). Another panel—the EMER DISABLED panel—of primary display 30 could be illuminated when the emergency has passed (i.e., disabled). Alternatively, the emergency condition can be displayed on supplemental display 40.

Regarding the second part of the test, the subject EOT unit 55 is tested to determine whether it properly responds to certain radio signals. It is well known that a two-way EOT unit, such as a TRAINLINK® II EOT unit, is designed to respond to an emergency brake radio signal by commanding its emergency brake valve to reduce the pressure in the brake pipe at an emergency rate. This aspect of the test can also be mimicked on the test bench, with the glad hand 7 of EOT unit 55 coupled to the pressurized test volume. Specifically, by toggling its emergency toggle switch 80, the microprocessor unit 10 of test device 100 will command transceiver 20 to transmit the emergency brake radio signal. The user can then verify whether the EOT unit responded correctly to the emergency brake radio signal.

A crude way to verify that the EOT unit responded properly would require the user merely to listen for the telltale sound of air escaping through the emergency brake valve of the EOT unit. A more accurate, and more appropriate, way to verify EOT unit operation would involve using any one of many known air-flow rate measurement devices whose specifics are outside the scope of this invention. Such a measurement device could be used to confirm that the subject EOT unit 55 did indeed reduce the pressure in the test volume at the emergency rate.

Yet another way to verify whether the EOT unit responded correctly to the emergency brake radio signal could involve the monitoring capabilities of the EOT unit itself. In particular, the user could verify the EOT unit's response to the emergency brake radio signal merely by looking at the appropriate display on the portable test device 100. For example, the user could verify the drop in pressure by watching the pressure decrement on the LED display panel. By toggling the emergency switch 80, the EMER ENABLED panel on primary display 30 should also be illuminated by microprocessor unit 10.

Referring still to the second part of the test, the two-way EOT unit 55 under test may be part of a TRAINLINK® ES or similar type EOT system. As described in the background section of this document, this type of EOT unit also responds to a service brake radio signal. The ES EOT unit does so by commanding its valve to reduce the pressure in the brake pipe/test volume at a service rate. By toggling a service toggle switch 90 on test device 100, the microprocessor unit 10 will command transceiver 20 to transmit the service brake radio signal. The user can then verify whether the ES EOT unit responded correctly to that radio signal. As noted earlier, one way to verify that the ES EOT unit responded properly would require the user merely to listen for the telltale sound of air escaping through the EOT unit's valve. The operation of the ES EOT unit could also be verified using an air-flow measurement device or merely by watching the pressure decrement on the LED panel of primary display 30. The latter ways, obviously, are preferable to confirm that the subject ES EOT unit 55 did indeed reduce the pressure at the service rate.

Another optional feature that could be added to portable device 100 is a quick communications test to confirm whether the EOT unit is still communicating faithfully with the test device. This feature could be used, for example, in situations where the readings on the panels of primary display 30 have remained constant for an unusually long time, thereby giving rise to concern that a problem may have arisen with the EOT system. This quick test could be implemented merely by a push of the arm/test button 70. Microprocessor unit 10 could be programmed to respond to activation of button 70 by commanding supplemental display 40 to display a message such as COMM FAIL if communications have been compromised or COMM OK if the test device 100 is still receiving valid data from the EOT unit.

From the foregoing, it should be apparent that the invention is ideally suited to test EOT units on fully assembled trains, particularly in areas having topographical features that may block or interfere with the transmission and reception of radio signals. Being portable, the test device 100 can be brought in close proximity to the last railcar on which the EOT unit is typically mounted. Such close proximity makes it highly unlikely that radio communications between the test device 100 and the EOT unit will suffer any significant interference. This portability overcomes one of the key shortcomings inherent to the previously explained prior art practices of testing a two-way EOT system.

Regarding all of the aforementioned functions that the microprocessor unit 10 must perform to implement the invention, it should be well within the ability of those persons skilled in the art of EOT systems to codify these functions into programming code. It is according to the instructions embodied in its programming code that the microprocessor unit 10 controls the overall operation of the portable test device 100.

Taken together, the memory storage device 50, thumbwheel switch assembly 60 and the arm/test button mechanism 70 may essentially be considered as a means for authorizing the portable device 100 to communicate with the subject EOT unit 55 according to the arming procedure. It should be understood that this authorizing means could, of course, also be implemented using various other known techniques and devices.

It should also be apparent that the emergency toggle switch 80 essentially serves as a means for initiating an emergency reduction in pressure in the test volume/brake pipe. Likewise, the service toggle switch 90 serves as a means for initiating a service reduction in pressure in the test volume/brake pipe. For each of the aforementioned means, various other devices or even different parts that together perform the same function as the cited means are intended to be encompassed by one or more of the ensuing claims.

The presently preferred embodiment for carrying out the invention has been set forth in detail according to the Patent Act. Those persons of ordinary skill in the art to which this invention pertains may nevertheless recognize various alternative ways of practicing the invention without departing from the spirit and scope of the following claims. Those of such skill will also recognize that the foregoing description is merely illustrative and not intended to limit any of the ensuing claims to any particular narrow interpretation.

Accordingly, to promote the progress of science and the useful arts, I secure for myself by Letters Patent exclusive rights to all subject matter embraced by the following claims for the time prescribed by the Patent Act.

I claim:

1. A portable device for testing an EOT unit of a two-way EOT radio telemetry system, such EOT unit capable of (A) transmitting (i) authorization signals relevant to an arming procedure for such two-way EOT system and (ii) data signals indicative of operational data for an apparatus to which such EOT unit is connected and (B) responding to (i) a status update request during such arming procedure and (ii) brake signals by reducing pressure in a volume to which such apparatus is connected; said portable device comprising:

(a) a means for authorizing said portable device to communicate with such EOT unit according to such arming procedure;

(b) a means for initiating an emergency reduction in pressure in such volume, said emergency initiating means being activatible only upon authorization of said portable device;

(c) a transceiver for communicating with such EOT unit;

(d) a display for indicating progress of such arming procedure and such operational data of such apparatus; and (e) a microprocessor unit for controlling operation of said portable device including (i) operating said transceiver in cooperation with said authorizing means in authorizing said portable device according to such arming procedure, (ii) causing said display to indicate (A) progress and completion of such arming procedure and, upon authorization of said portable device, (B) such operational data, and (iii) causing said transceiver to transmit an emergency brake signal upon activation of said emergency initiating means thereby ordering such EOT unit to reduce pressure in such volume at an emergency rate.

2. The portable device, as claimed in claim 1, wherein said means for authorizing includes:

(a) a memory storage device for storing at least an identification code such that said microprocessor unit in response to a first of such authorization signals received from such EOT unit during such arming procedure causes said display to indicate an ARM NOW message if such identification code currently stored in said memory storage device differs from an identification code of such EOT unit contained within such first authorization signal;

(b) an ARM/TEST button mechanism that when pushed within a preset time of said ARM NOW message being displayed causes said microprocessor unit to transmit via said transceiver said status update request; and (c) a thumb wheel switch assembly such that said microprocessor unit in response to a second of such authorization signals received from such EOT unit during such arming procedure causes (i) said display to indicate an ARMED message and (ii) such identification code contained within such first authorization signal to overwrite in said memory storage device the identification code previously stored therein, if said thumb wheel switch assembly has been set to such identification code of such EOT unit.

3. The portable device, as claimed in claim 2, wherein said memory storage device is nonvolatile memory.

4. The portable device, as claimed in claim 1, further including a means for initiating a service reduction in pressure in such volume upon activation of which said microprocessor unit causes said transceiver to transmit a service brake signal thereby ordering such EOT unit to reduce pressure in such volume at a service rate, said service initiating means being activatible only upon authorization of said portable device.

5. The portable device, as claimed in claim 4, wherein said service initiating means includes a service toggle switch.

6. The portable device, as claimed in claim 4, wherein said means for authorizing includes:

(a) a memory storage device for storing at least an identification code such that said microprocessor unit in response to a first of such authorization signals received from such EOT unit during such arming procedure causes said display to indicate an ARM NOW message if such identification code currently stored in said memory storage device differs from an identification code of such EOT unit contained within such first authorization signal;

(b) an ARM/TEST button mechanism that when pushed within a preset time of said ARM NOW message being displayed causes said microprocessor unit to transmit via said transceiver said status update request; and (c) a thumb wheel switch assembly such that said microprocessor unit in response to a second of such authorization signals received from such EOT unit during such arming procedure causes (i) said display to indicate an ARMED message and (ii) such identification code contained within such first authorization signal to overwrite in said memory storage device the identification code previously stored therein, if said thumb wheel switch assembly has been set to such identification code of such EOT unit.

7. The portable device, as claimed in claim 1, wherein said emergency initiating means includes an emergency toggle switch.

8. The portable device, as claimed in claim 1, wherein such operational data includes at least one of: (a) pressure in such volume; (b) whether such apparatus is moving or stationary; and (c) whether an emergency condition has occurred.

9. The portable device, as claimed in claim 1, wherein said portable device is powered by battery.

10. The portable device, as claimed in claim 9, wherein such operational data includes at least one of: (a) pressure in such volume; (b) whether such apparatus is moving or stationary; (c) whether the state of charge of said battery is low; and (d) whether an emergency condition has been detected.

11. A portable device for testing an EOT unit of a two-way EOT radio telemetry system, such EOT unit connected to a brake pipe on a railcar of a train and capable of (A) transmitting (i) authorization signals relevant to an arming procedure for such two-way EOT system and (ii) data signals indicative of operational data for such railcar and (B) responding to (i) a status update request during such arming procedure and (ii) brake signals by reducing pressure in such brake pipe according to the dictates of the particular one of such brake signals received; said portable device comprising:

(a) a means for authorizing said portable device to communicate with such EOT unit according to such arming procedure;

(b) a means for initiating an emergency reduction in pressure in such brake pipe, said emergency initiating means being activatible only upon authorization of said portable device;

(c) a transceiver for communicating with such EOT unit;

(d) a display for indicating progress of such arming procedure and such operational data of such railcar; and (e) a microprocessor unit for controlling operation of said portable device including causing (i) said display to indicate an ARM NOW message if a first of such authorization signals is received from such EOT unit in accordance with such arming procedure, (ii) said transmitter to send said status update request if said authorizing means is manipulated according to such arming procedure, (iii) said display to indicate an ARMED message if a second of such authorization signals is received from such EOT unit in accordance with such arming procedure and, upon authorization of said portable device, (iv) said display to indicate such operational data, and (v) said transceiver to transmit an emergency brake signal upon activation of said emergency initiating means thereby ordering such EOT unit to reduce pressure in such brake pipe at an emergency rate.

12. The portable device, as claimed in claim 11, wherein said means for authorizing includes:

(a) a memory storage device such that said microprocessor unit in response to such first authorization signal causes said display to indicate said ARM NOW message if the identification code currently stored in said memory storage device differs from an identification code of such EOT unit contained within such first authorization signal;

(b) an ARM/TEST button mechanism that when pushed within a preset time of said ARM NOW message being displayed causes said microprocessor unit to transmit via said transceiver said status update request; and (c) a thumb wheel switch assembly such that said microprocessor unit in response to such second authorization signal causes (i) said display to indicate said ARMED message and (ii) such identification code contained within such first authorization signal to overwrite in said memory storage device the identification code previously stored therein, if said thumb wheel switch assembly has been set to such identification code of such EOT unit.

13. The portable device, as claimed in claim 12, wherein said memory storage device is nonvolatile memory.

14. The portable device, as claimed in claim 11, further including a means for initiating a service reduction in pressure in such brake pipe upon activation of which said microprocessor unit causes said transceiver to transmit a service brake signal thereby ordering such EOT unit to reduce pressure in such brake pipe at a service rate, said service initiating means being activatible only upon authorization of said portable device.

15. The portable device, as claimed in claim 14, wherein said service initiating means includes a service toggle switch.

16. The portable device, as claimed in claim 14, wherein said means for authorizing includes:

(a) a memory storage device such that said microprocessor unit in response to such first authorization signal causes said display to indicate said ARM NOW message if the identification code currently stored in said memory storage device differs from an identification code of such EOT unit contained within such first authorization signal;

(b) an ARM/TEST button mechanism that when pushed within a preset time of said ARM NOW message being displayed causes said microprocessor unit to transmit via said transceiver said status update request; and (c) a thumb wheel switch assembly such that said microprocessor unit in response to such second authorization signal causes (i) said display to indicate said ARMED message and (ii) such identification code contained within such first authorization signal to overwrite in said memory storage device the identification code previously stored therein, if said thumb wheel switch assembly has been set to such identification code of such EOT unit.

17. The portable device, as claimed in claim 11, wherein said emergency initiating means includes an emergency toggle switch.

18. The portable device, as claimed in claim 11, wherein such operational data includes at least one of: (a) pressure in such brake pipe; (b) whether such railcar is moving or moving; and (c) whether an emergency condition has occurred.

19. The portable device, as claimed in claim 11, wherein said portable device is powered by battery.

20. The portable device, as claimed in claim 19, wherein such operational data includes: (a) pressure in such brake pipe; (b) whether such railcar is moving or stationary; (c) whether the state of charge of said battery is low; and (d) whether an emergency condition has been detected.

\* \* \* \* \*